United States Patent [19]
Holmquest et al.

[11] Patent Number: 5,679,432
[45] Date of Patent: Oct. 21, 1997

[54] MULTI-LAYER LAMINATE STRUCTURE

[75] Inventors: John H. Holmquest; John P. Devine, both of Watertown, S. Dak.

[73] Assignee: Benchmark Foam, Inc., Watertown, S. Dak.

[21] Appl. No.: 239,740

[22] Filed: May 9, 1994

[51] Int. Cl.$^6$ .................................................. B32B 3/00
[52] U.S. Cl. ................... 428/71; 428/318.4; 428/319.1; 428/319.7; 428/325
[58] Field of Search ........................... 428/71, 318.4, 428/319.1, 319.7, 325

[56] References Cited

U.S. PATENT DOCUMENTS

| | | | |
|---|---|---|---|
| 4,229,497 | 10/1980 | Piazza | 428/71 |
| 4,457,729 | 7/1984 | Peerlkamp | 441/74 |
| 4,617,217 | 10/1986 | Michaud-soret | 428/71 |
| 4,621,002 | 11/1986 | Kuhlmann et al. | 428/71 |
| 4,753,836 | 6/1988 | Mizell | 428/71 |
| 4,795,666 | 1/1989 | Okada et al. | 428/71 |
| 4,850,913 | 7/1989 | Szabad, Jr. | 441/65 |
| 4,879,164 | 11/1989 | Younes | 428/209 |
| 4,963,408 | 10/1990 | Huegli | 428/71 |
| 5,091,436 | 2/1992 | Frisch et al. | 521/137 |
| 5,098,778 | 3/1992 | Minnick | 428/285 |
| 5,112,663 | 5/1992 | Morenz et al. | 428/71 |

OTHER PUBLICATIONS

Article entitled *Arco Launches Joint Foams Effort*.
Article entitled *Two New Foams Improve Cushioning*, Packaging (Apr. 1986).
Arco Chemical Company Ad entitled *Introducing ARCEL™ Moldable Polyethylene Copolymer*, Packaging, p. 73, (Sep. 1984).
Arco Chemical Company Ad entitled *Reusable Packaging Application*, 1985 Atlantic Richfield Company.
Arco Chemical Company Ad entitled *Chemical Resistance of Foam Molded from ARCEL Moldable Polyethylene Copolymer*.
Article entitled *Moldable Polyethylene Cushions Electronic Items*, Packaging, pp. 87–90 (Sep. 1984).
Article entitled *EPS Molders: Now There's EPE*, Plastics Technology, pp. 23–24 (Aug. 1984).
Article entitled *Make Sure It's Versatile*, Heavy Duty Trucking, pp. 68–82 (Jun. 1993).
Sawlley, *Trailers for the Next Century*, Business Page, pp. 6–7 (Dec. 6, 1992).
Berg, *Lighten Up?*, Heavy Duty Trucking, pp. 74–77 (Sep. 1993).
Stadden, *Attack of the Plate*, Heavy Duty Trucking, pp. 62–64 (Jul. 1992).
Stadden, *the Latest in Intermodal*, Heavy Duty Trucking, pp. 68–76 (Jul. 1993).

*Primary Examiner*—E. Rollins Buffalow
*Attorney, Agent, or Firm*—Kinney & Lange, P.A.

[57] ABSTRACT

The present invention relates to a multi-layer laminate structure. The multi-layer laminate structure includes a foam core element and a fiber-reinforced plastic matrix. The foam core element includes at least an outermost portion that is formed from a closed cell expanded foam, wherein the closed cell expanded foam is expanded polyethylene-polystyrene copolymer foam. The outermost portion of the foam core element is constructed from a material that is not attacked or degraded by the material used in the fiber-reinforced plastic matrix. The fiber-reinforced plastic matrix is formed over the outermost portion of the core element.

21 Claims, 1 Drawing Sheet

MULTI-LAYER LAMINATE STRUCTURE

BACKGROUND OF THE INVENTION

The present invention relates to a foam core structure. More particularly, the present invention relates to a multi-layer laminate structure having improved strength and durability.

Traditionally, metals, such as steel and aluminum, and concrete have been used to fabricate structures that support many types of objects. For example, steel and aluminum are typically used to fabricate truck trailers, while steel and concrete are typically used to construct bridges.

To reduce the weight that is associated with constructing trailers primarily from steel and aluminum, one prior art design for a flatbed truck trailer includes forming a deck of fiber-reinforced plastic over plywood. The deck is then attached to two center beams. As a result of the stiffness provided by the fiber-reinforced plastic and plywood deck, cross members are not needed to support the deck.

Huegli, U.S. Pat. No. 4,963,408, describes a fiber layer coated foam core laminate structure that is suitable for use on top, bottom, and sides of a truck trailer. Huegli indicates that the core layer is constructed from a rigid polymeric foam, such as high density polyvinyl chloride. The core layer is covered by a fiber layer that includes at least one glass filament layer and a fiber mat layer. The fiber mat is the load bearing component of the laminate structure. An outer encapsulating layer is required to protect the laminate structure.

Morenz et al., U.S. Pat. No. 5,112,663, discloses a method of constructing a composite structure that can be used as an aircraft wing. A rigid closed-cell foam core structure is heated and compressed to a desired shape in a mold. The structure is then wrapped with an outer layer that consists of a sheet of flexible open-cell foam impregnated with a thermosetting resin and a sheet of fiber-reinforced material. Finally, the wrapped core structure is cured to strengthen the structure.

Frisch et al., U.S. Pat. No. 5,091,436, describes a reinforced foam that is suitable for use in boards. The board has a foam core with two major surfaces. Chopped glass fiber layers are formed on the major surfaces. The board is strengthened by a continuous fiber mat that is formed on the glass fiber layers. The board is further strengthened by a layer of continuous fiber strands.

Okada et al, U.S. Pat. No. 4,795,666, describes a fiber-reinforced structural member. The structural member has a plurality of fiber-reinforced core portions that are filled with polyurethane foam. The core portions are then inserted into a fiber-reinforced plastic shell element. A resin is applied to the core portions to fill gaps between the core portions and the shell elements.

Michaud-Soret, U.S. Pat. No. 4,617,217, describes a composite structure that is used in the construction of a beam or girder. The composite structure includes a plurality of weight bearing box structures arranged in two rows. One of the box structure rows is positioned above an upper edge of a foam core and the other box structure row is positioned below a lower edge of the foam core. In addition, a fiber web is affixed on the surface of each of the box structure rows.

SUMMARY OF THE INVENTION

The present invention relates to a multi-layer laminate structure. The multi-layer laminate structure includes a foam core element and a fiber-reinforced plastic matrix. The foam core element includes at least an outermost portion that is formed from a closed cell expanded foam selected from the group consisting of expanded polystyrene foam, expanded polypropylene foam, expanded polyethylene foam, and expanded polyethylene-polystyrene copolymer foam. The outermost portion of the foam core element is constructed from a material that is not attacked or degraded by the material used in the fiber-reinforced plastic matrix. The fiber-reinforced plastic matrix is formed over the outermost portion of the core element.

DETAILED DESCRIPTION OF THE PREFERRED EMBODIMENTS

Figure 1:
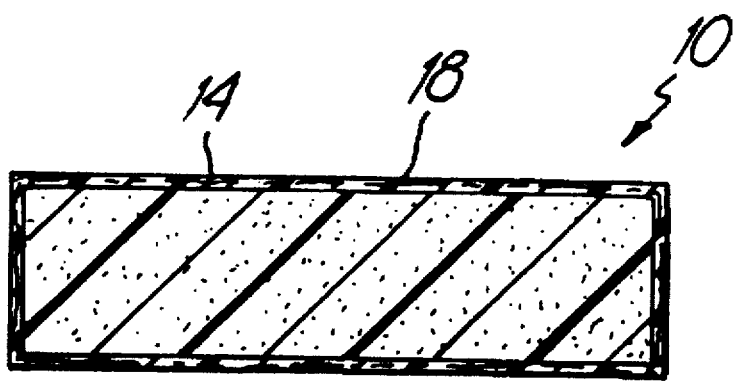
FIG. 1 is a sectional view of a first preferred embodiment of the present invention.

A First Embodiment (FIG. 1)

A multi-layer laminate structure according to the present invention is illustrated at 10 in FIG. 1. The multi-layer laminate structure 10 includes a foam core 14 that is surrounded by a fiber-reinforced plastic matrix 18.

The foam core 14 preferably has a thickness of between 6 inches and 4 feet, a width of between 1 foot and 6 feet, and a length of between 8 feet and 16 feet. Because the foam core 14 has a synergistic effect on the strength of the multi-layer laminate structure, the dimensions of the foam core 14 are selected based on the load that it is anticipated to be placed on the multi-layer laminate structure 10.

The fiber-reinforced plastic matrix 18 preferably has a thickness of ⅛ of an inch and greater. The desired thickness of the fiber-reinforced plastic matrix 18 is determined based on the load that is anticipated to be placed on the multi-layer laminate structure 10. When calculating the thickness of the fiber-reinforced plastic matrix 18, the synergistic effect of combining the foam core 14 and the fiber-reinforced plastic matrix 18 should be taken into account.

The core 14 of the multi-layer laminate structure 10 is formed from expanded polystyrene foam, expanded polyethylene foam, expanded polypropylene foam, or a copolymer thereof. The core 14 is preferably constructed from a polyethylene-polystyrene copolymer foam. The ratio of polyethylene to polystyrene in the polyethylene-polystyrene copolymer foam is preferably between 1:1 and 5:1.

Preferably, the polyethylene-polystyrene copolymer foam is ARCEL® foam, which can be obtained from ARCO Chemical Company of New Town Square, Pa. ARCEL® foam is a closed cell moldable copolymer having a pre-expanded density of between 1.5 and 3.0 pounds per cubic foot.

Conventional expanded polystyrene equipment and processes with modifications as needed and knowledge of ARCEL® molding technology are used to form ARCEL® foam beads into foam blocks. Preferably, a two-step process is used. The first step is pre-expansion and the second step is molding. The pre-expansion step is necessary when forming ARCEL® foam because it insures a uniform density of the expanded beads. The uniform expanded bead density is a prerequisite to obtaining foam sheets with consistent properties.

In the first step, the foam beads are conveyed into a pre-expansion tank. Steam is fed into the tank to cause the pre-expansion of the foam beads. As the temperature in the tank approaches 180° F., initial expansion occurs through vaporization of a blowing agent on the foam beads. The vaporization is then followed by permeation of the steam into the beads, which causes further expansion of the foam beads. The amount of expansion is controllable by the volume of foam beads fed into the pre-expansion tank, steam feed rate, steam pressure, steam temperature, and amount of air introduced into the steam. When the pre-expansion is complete, the beads are allowed to age for between 3 and 12 hours.

The pre-expanded foam beads are then conveyed into a cavity of a block molding machine. Care must be exercised when conveying the pre-expanded ARCEL® foam beads because expanded polyethylene beads in the ARCEL® foam have larger and softer beads that are easily damaged.

The typical block molding machine cavity is 16 feet long, 3 feet wide, and 4 feet high. When the mold is filled, it is closed and steam is injected into the mold cavity. The steam causes the foam beads to expand and fill out the cavity and fuse together. After expansion is complete, the mold cavity is cooled and the molded foam block is removed.

The molded foam block may be cut into desired shapes or used without modification. If it is desired to cut the molded foam block, a band saw or a hot wire may be used. The hot wire is typically preferred because of its speed and versatility.

The expanded ARCEL® foam blocks exhibit good compressive strength and compressive creep characteristics as well as a low water vapor transmission rate. Results from testing of a 1.7 pound/cubic foot density ARCEL® expanded foam block are illustrated in Table 1.

TABLE 1

| Compressive Strength Deformation (psi) | |
|---|---|
| 5% | 9.9 |
| 10% | 13.3 |
| 25% | 15.7 |
| Compressive Creep (%) | |
| Deformation after 500 hours at 4 psi and 73° F. | 2.3 |
| Dynamic set, percent loss of cushion thickness after fifth drop test at 1.0 psi static stress | 7.5 |
| Water Vapor Transmission Rate (grains/hour-foot$^2$) | <0.2 |

The fiber-reinforced plastic matrix 18 is preferably constructed from glass fibers having a diameter of between 0.0001 and 0.001 inches and an average length of between ⅛ of an inch and 2 inches. The glass fibers preferably have a tensile strength of approximately 500,000 psi. and a modulus of elasticity of $10.5 \times 10^6$ psi. The glass fibers are preferably supplied in a chopped strand mat having a thickness of between ⅛ of an inch and ½ of an inch.

The fibers for the fiber-reinforced plastic matrix 18 can also be constructed from other materials that are known in the art, such as carbon, graphite, aramid, polyester, and boron. Selection of the particular fiber material is based on the desired strength, torque resistance, and other physical properties of the multi-layer laminate structure 10.

A resin is then mixed with the glass fibers prior to application of the fiber-reinforced plastic matrix 18 to the foam core 14. The resin is either a nylon, polycarbonate, acetal, polyethylene or polyester based material. Selection of the resin is known in the art and should be done based on the conditions and stresses that will be placed upon the multi-layer laminate structure 10.

The multi-layer laminate structure 10 is preferably formed by either vacuum bagging, pressure forming, or hand lay-up. Vacuum bagging is suited to forming a laminate structure with high fiber content, high interlaminate bond strengths, and reduced weight. In vacuum bagging, the foam core 14 and the material for the fiber-reinforced plastic matrix 18 are positioned in a mold. A vacuum bag is then sealed around the perimeter of the mold and a vacuum is applied. As a result of the air between the vacuum bag and the mold being removed, the atmospheric pressure against the vacuum bag forces the vacuum bag against the foam core 14 and the fiber-reinforced plastic matrix 18 and thereby causes the multi-layer laminate structure 10 to be formed.

Alternatively, the multi-layer laminate structure 10 can be pressure formed. In pressure forming, a flexible bag is placed over the foam core 14 and the fiber-reinforced plastic matrix 18. Pressures of up to 50 psi are then applied to force the bag against a mold. The pressure causes the fiber-reinforced plastic matrix 18 to bond with the foam core 14 and thereby results in the formation of the multi-layer laminate structure 10.

The multi-layer laminate structure 10 can also be formed using hand lay-up techniques. With hand lay-up, the resin is applied over the foam core 14. The fiber-reinforced plastic matrix is applied and then another layer of resin is applied. The multi-layer laminate structure is then cured to form the multi-layer laminate structure 10.

When it is desired to use the multi-layer laminate structure 10 in applications that do not require the synergistic strength and torque resistance characteristics resulting from combining the foam core 14 and the fiber-reinforced plastic matrix 18, the foam core 14 may be covered by a plastic material that is not reinforced with fibers. In this case, the plastic material may be formed over the foam core 14 using methods that are known in the art, such as injection molding.

The strength and properties of the multi-layer laminate structure 10 are such that hydraulic fluid lines and electric wiring can be run through the foam core 14 because the foam core 14 remains stable when contacted with petroleum-based compounds and does not conduct electricity. By including hydraulic fluid lines and electric wiring in the foam core 14, the lines and wiring are protected from damage and deterioration.

The foam core 14 can be cored after formation to provide apertures through which the lines and wiring will be placed. In the alternative, apertures for the lines and wiring can formed by placing objects that correspond with the apertures in the mold in which the foam core 14 is formed. Selection of the most appropriate method of forming the apertures is based on the size and shape of the foam core 14.

The multi-layer laminate structure 10 of the present invention exhibits several advantages over prior art designs. When the foam core is typically covered with a fiber-reinforced plastic matrix, the fiber-reinforced plastic matrix provides substantially all of the strength and the foam core is essentially a void filler. The multi-layer laminate structure 10 of the present invention, on the other hand, exhibits a synergistic improvement in strength when the fiber-reinforced plastic matrix 18 is applied to the foam core 14 described in the present invention. The improvement is especially valuable because the foam core 14 imparts isotropic strength to the fiber-reinforced plastic matrix 18, which is typically anisotropic.

Yet another benefit of the multi-layer laminate structure 10 is that the foam core 14 described herein provides a stable surface to which the fiber-reinforced plastic matrix 18 can bond. By "stable" it is meant that resins in the fiber-reinforced plastic matrix 18 do not attack or cause degradation of the foam core 14.

The multi-layer laminate structure 10 of the present invention is lighter in weight than a comparable member constructed from traditional materials, such as metal and concrete. As a result, a trailer or other device that incorporates the multi-layer laminate structure 10 is capable of hauling a greater cargo weight while remaining within the applicable vehicle weight restrictions. In addition, the multi-layer laminate structure 10 enables fuel costs to be reduced and expected life cycles for the trailer or other device to be increased.

Another advantage of the multi-layer laminate structure 10 is that it dampens vibrations and shocks placed upon the trailer. As the trailer is traveling on a road, it is subjected to vibrations caused by irregularities in the pavement. Conventional trailers transmit, and frequently amplify, the vibrations to the cargo being transported on the trailer. The multi-layer laminate structure 10 of the present invention dampens the vibrations and thereby minimizes the possibility of damage to the cargo being carried on the trailer.

The dampening characteristics of the multi-layer laminate structure 10 also minimize shocks resulting when a multi-layer laminate structure object collides with another object. Thus, damage to the multi-layer laminate structure object and cargo being carried by the multi-layer laminate structure object is substantially reduced. The multi-layer laminate structure also assists in minimizing damage to other vehicles that collide with the multi-layer laminate structure.

Figure 2:
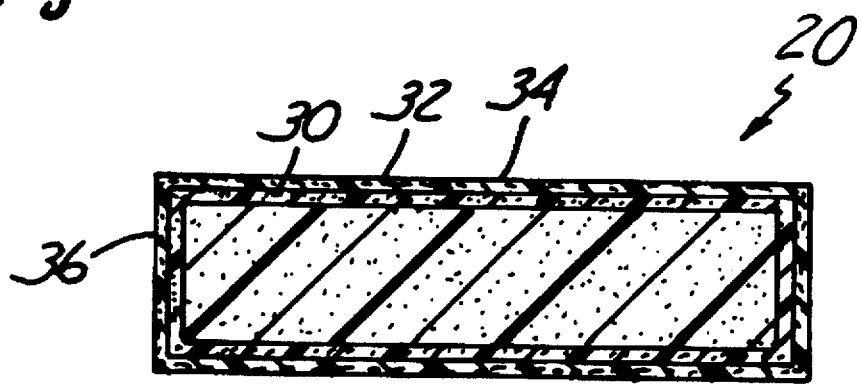
FIG. 2 is a sectional view of a second preferred embodiment of the present invention.

A Second Embodiment (FIG. 2)

In another preferred embodiment, the weight and cost of a multi-layer laminate structure 20 are reduced by using a multi-component core 30 as illustrated in FIG. 2. In addition to reducing weight and cost, the multi-layer laminate structure 20 provides strength that is superior to prior art laminates while avoiding incapabilities between the foam core 30 and resin in a fiber-reinforced plastic matrix 36.

The multi-layer laminate structure 20 includes a multi-component core 30. The multi-component core 30 preferably has a first core portion 32 and a second core portion 34. The first core portion 32 is preferably entirely covered by the second core portion 34. The multi-component core 30 is then covered by the fiber-reinforced plastic matrix 36.

The first core portion 32 preferably has a thickness of between 6 inches and 4 feet, a width of between 1 foot and 6 feet, and a length of between 8 feet and sixteen feet. The dimensions of the first core portion 32 are selected based upon the proportion of the multi-component core 30 that is desired to be replaced by a less dense material in the first core portion 32.

The second core portion 34 preferably has a thickness of between 1 inch and 12 inches over the entire surface of the first core portion 32. Because the second core portion 34 has a positive effect on the strength of the multi-layer laminate structure 20, the thickness of the second core portion 34 is selected based on the load that is anticipated to be placed on the multi-layer laminate structure 20.

The fiber-reinforced plastic matrix 36 preferably has a thickness of ⅛ of an inch and greater. The desired thickness of the fiber-reinforced plastic matrix 36 is determined based on the load that is anticipated to be placed on the multi-layer laminate structure 20. When calculating the thickness of the fiber-reinforced plastic matrix 36, the synergistic effect of combining the second core portion 34 and the fiber-reinforced plastic matrix 36 should be taken into account.

The multi-component core 30 provides for greater design flexibility when designing the multi-layer laminate structure 20. The second core portion 34 of this embodiment is similar to the core 14 of the multi-layer laminate structure 10 illustrated in FIG. 1 in that it provides synergistic strength to the multi-layer laminate structure 20. However, when the multi-layer laminate structure 20 is not expected to be subjected to great forces, the first core portion 32 of the foam core may be replaced by a less dense and possibly less expensive foam material.

It might also be desirable to form the first core portion 32 of the multi-component core 30 from a less dense material so that the weight of the multi-layer laminate structure 20 can be reduced. In addition to providing strength, the foam in the second core portion 34 provides a barrier between the first core portion 32 and a fiber-reinforced plastic matrix 36. The barrier is important when there are incompatibilities between resins in the fiber-reinforced plastic matrix 36 and the first core portion 32, which would result in the first foam core portion 32 being attacked or degraded.

The first core portion 32 is constructed from expanded polystyrene foam, expanded polyethylene foam, expanded polypropylene foam or a copolymer thereof. Other materials may be selected based on the desire to provide a lighter weight structure. The first core portion 32 is preferably constructed from expanded polystyrene foam.

The second core portion 34 is formed from expanded polystyrene foam, expanded polyethylene foam, expanded polypropylene foam, or a copolymer thereof. The second core portion 34 is preferably constructed from a polyethylene-polystyrene copolymer foam. The ratio of polyethylene to polystyrene in the polyethylene-polystyrene copolymer foam is preferably between 1:1 and 5:1. Similar to the core in the first embodiment, the polyethylene-polystyrene copolymer foam is preferably ARCEL® foam.

The fiber-reinforced plastic matrix 36 is preferably constructed from fibers having a diameter of between 0.0001 and 0.001 inches and an average length of between ⅛ and 2 inches. The glass fibers preferably have a tensile strength of approximately 500,000 psi. and a modulus of elasticity of $10.5 \times 10^6$ psi. The glass fibers are preferably supplied in a chopped strand mat having a thickness of between ⅛ and ½ inches.

A resin is then mixed with the glass fibers prior to application of the fiber-reinforced plastic matrix 36 to the core 30. The resin is either a nylon, polycarbonate, acetal, polyethylene or polyester based material. Selection of the resin is known in the art and should be done based on the conditions and stresses that will be placed upon the multi-layer laminate structure 20.

The fibers for the fiber-reinforced plastic matrix 36 can also be constructed other materials that are known in the art, such as carbon, graphite, aramid, polyester, and boron. Selection of the particular fiber material is based on the desired strength, torque resistance, and other physical properties of the multi-layer laminate structure 20.

In this preferred embodiment, the foam for the first core portion 32 is preferably molded using a two-step process. The first step is pre-expansion and the second step is molding. In the first step, first element foam beads are conveyed into a pre-expansion tank. Steam is fed into the tank to cause the pre-expansion of the foam beads. As the temperature in the tank approaches 180° F., initial expansion occurs through vaporization of a blowing agent on the foam beads. The vaporization is then followed by followed by permeation of the steam into the beads, which causes further expansion of the foam beads. The amount of expansion is controllable by the volume of foam beads fed into the pre-expansion tank, steam feed rate, steam pressure, steam temperature, and amount of air introduced into the steam. When the pre-expansion is complete, the foam beads are allowed to age for between 3 and 12 hours.

The pre-expanded first core portion foam beads are then conveyed into a cavity of a block molding machine. The size of the cavity is selected based upon the desired size of the first core portion 32. Alternatively, the first core portion 32 can be formed in a standard mold and then cut to a desired size. When the mold cavity is filled, it is closed and steam is injected into the mold cavity. After expansion is complete, the mold cavity is cooled and the molded foam block is removed.

The foam for the second core portion 34 is also preferably molded using a two-step process. The first step is pre-expansion and the second step is molding. In the first step, second core portion foam beads are conveyed into a pre-expansion tank. Steam is fed into the tank to cause the pre-expansion of the foam beads. As the temperature in the tank approaches 180° F. initial expansion occurs through vaporization of a blowing agent on the foam beads. The vaporization is then followed by permeation of the steam into the beads, which causes further expansion of the foam beads. The amount of expansion is controllable by volume of foam beads fed into the pre-expansion tank, steam feed rate, steam pressure, steam temperature, and amount of air introduced into the steam. When the pre-expansion is complete, the foam beads are allowed to age for between 3 and 12 hours.

The pre-expanded second core portion foam beads are then conveyed into a cavity of a block molding machine. The size of the cavity is selected based upon the desired size of the second core portion 34. Alternatively, the second core portion 34 can be formed in a standard mold and then cut to the desired size. When the mold cavity is filled, it is closed and steam is injected into the mold cavity. After expansion is complete, the mold cavity is cooled and the sections for the second core portion are removed.

The second core portion sections are adhesively affixed to the first core portion 32 using adhesives that are known in the art. The second core portion sections preferably cover all of the exposed surfaces of the first core portion 32.

In the alternative, the multi-component core 30 can be constructed be expanding foam beads for the second core portion 34 around the first core portion 32 in a cavity of a block molding machine. With this method, the size of the first core portion 32 should be small enough to allow at least 2 inches on each side when the first core portion 32 is placed in the block molding machine cavity for molding the second core portion 34.

A layer of the pre-expanded second core portion foam beads is fed into the cavity of the block molding machine. The thickness of the layer is based upon the desired thickness of the second core portion 34. Then the molded first core portion 32 is placed in the mold cavity. Care must be taken when placing the first core portion 32 in the mold cavity so that spaces between the first core portion 32 and each of the sides of the mold cavity are approximately equal.

Additional amounts of pre-expanded second core portion foam beads are fed into the cavity to fill the spaces between the first core portion foam block and the sides of the mold cavity. Then a layer of pre-expanded second core portion foam beads is placed on an upper surface of the first core portion 32. The mold is now closed and steam is injected into the mold cavity. The steam causes the foam beads to expand and fill out the cavity and fuse together. After expansion is complete, the mold is cooled and the molded multi-component core 30 is removed.

The multi-layer laminate structure 20 is preferably either formed by either vacuum bagging, pressure forming, or hand lay-up. Vacuum bagging is suited to forming a laminate structure with high fiber content, high interlaminate bond strengths, and reduced weight. In vacuum bagging the multi-component core 30 and the material for the fiber-reinforced plastic matrix 36 are positioned in a mold. A vacuum bag is then sealed around the perimeter of the mold and a vacuum is applied. As a result of the air between the vacuum bag and the mold being removed, the atmospheric pressure against the vacuum bag forces the vacuum bag against the multi-component core 30 and the fiber-reinforced plastic matrix 36 and thereby forms the multi-layer laminate structure 20.

Alternatively, the multi-layer laminate structure 20 can be pressure formed. In pressure forming, a flexible bag is placed over the multi-component core 30 and the material for the fiber-reinforced plastic matrix 36. Pressures of up to 50 psi are then applied to force the bag against a mold. The pressure causes the fiber-reinforced plastic matrix 36 to bind with the multi-component core 30 and thereby results in the formation of the multi-layer laminate structure 20.

The multi-layer laminate structure 10 can also be formed using hand lay-up techniques. With hand lay-up, the resin is applied over the multi-component core 30. Next, the matrix is applied and another layer of resin is applied. The multi-layer laminate structure 20 is then cured.

The multi-layer laminate structure having either the single-component or multi-component core is suitable for use in a variety of applications where an object is sought to be supported. For example, the multi-layer laminate structure can be formed in large sheets and used as a core for a bridge or a composite flat bed track trailer. When used in bridge construction applications, the multi-layer laminate structure enables the superstructure of the bridge to be made from lighter weight materials. In addition, the multi-layer laminate structure is strong enough when used in the composite flat bed truck trailer that it enables the trailer to be constructed without using steel or aluminum support beams that span the length of the trailer. As a result the weight of the trailer is considerably reduced and a greater weight of cargo to be placed upon the trailer while remaining under the maximum weight restrictions.

The multi-layer laminate structure is also suitable for use in other areas where lightweight and strength are desired. For instance, the foam core can be molded into a variety of shapes, such as a boat hull, chair or table. Then the foam core would be covered by a layer of fiber-reinforced plastic matrix or other plastic polymers to complete the object.

Although the present invention has been described with reference to preferred embodiments, workers skilled in the art will recognize that changes may be made in form and detail without departing from the spirit and scope of the invention.

What is claimed is:

1. A load-bearing multi-layer laminate structure comprising:
   a foam core element having at least an outermost portion formed by a closed cell expanded foam, wherein the closed cell expanded foam is expanded polyethylene-polystyrene copolymer foam and wherein the foam core element has a thickness, width, and length that are each greater than about six inches; and a fiber-reinforced plastic matrix formed over and bonded to the outermost portion of the core element, wherein the fiber-reinforced plastic matrix has a thickness of at least about ⅛ of an inch and wherein the multi-layer laminate structure is capable of supporting a load of at least 10,000 pounds.

2. The load-bearing multi-layer laminate structure of claim 1 wherein the foam core element further comprises an inner portion of expanded polymeric foam that is surrounded and covered by the outermost portion.

3. The load-bearing multi-layer laminate structure of claim 2 wherein the inner portion is an expanded foam selected from the group consisting of expanded polystyrene foam, expanded polypropylene foam, expanded polyethylene foam, and expanded polyethylene-polystyrene copolymer foam.

4. The load-bearing multi-layer laminate structure of claim 1 wherein a ratio of polyethylene to polystyrene in the expanded polyethylene-polystyrene copolymer foam is between 1:1 and 5:1.

5. The load-bearing multilayer laminate structure of claim 1 wherein the fiber-reinforced plastic matrix comprises fibers selected from the group consisting of glass, carbon, graphite, aramid, polyester, boron, and combinations thereof, wherein the fibers have a diameter of between 0.0001 and 0.001 inches and an average length of between ⅛ of an inch and 2 inches.

6. A load-bearing multi-layer laminate structure comprising:

a core unit having a thickness of at least about 6 inches, a width of at least about 1 foot, and a length of at least about 8 feet, wherein the core unit comprises:
a first expanded foam core portion; and
a second expanded foam core portion, the first expanded foam core portion is covered by the second expanded foam core portion, wherein the second expanded foam core portion is expanded polyethylene-polystyrene copolymer foam; and a fiber-reinforced plastic matrix is formed over and bonded to the second expanded foam core portion, wherein the fiber-reinforced plastic matrix has a thickness of at least ⅛ of an inch.

7. The load-bearing multi-layer laminate structure of claim 6 wherein the first expanded foam core portion is isotropic.

8. The load-bearing multi-layer laminate structure of claim 6 wherein the second expanded foam core portion is isotropic.

9. The load-bearing multi-layer laminate structure of claim 6 wherein the fiber-reinforced plastic matrix is anisotropic.

10. The load-bearing multi-layer laminate structure of claim 6 wherein the first expanded foam core portion is an expanded foam selected from the group consisting of expanded polystyrene foam, expanded polypropylene foam, expanded polyethylene foam, and expanded polyethylene-polystyrene copolymer foam.

11. The load-bearing multi-layer laminate structure of claim 6 wherein the foam core element includes an aperture formed therein, the aperture is suitable for providing a passageway for hydraulic lines or electrical wires.

12. The load-bearing multi-layer laminate structure of claim 6 wherein the fiber-reinforced plastic matrix comprises fibers selected from the group consisting of glass, carbon, graphite, aramid, polyester, boron, and combinations thereof.

13. A multi-layer laminate structure comprising:

a foam core formed of an expanded polyethylene-polystyrene copolymer foam and having a thickness of at least approximately 6 inches and two other dimensions that are each at least about 1 foot; and a fiber-reinforced plastic matrix formed over and bonded to the foam core and having a thickness of at least ⅛ of an inch, wherein the multi-layer laminate structure is capable of supporting a load placed on the multi-layer laminate structure.

14. The multi-layer laminate structure of claim 13 wherein the foam core element further comprises an inner portion of expanded polymeric foam that is surrounded and covered by the outermost portion.

15. The multi-layer laminate structure of claim 14 wherein the inner portion is an expanded foam selected from the group consisting of expanded polystyrene foam, expanded polypropylene foam, expanded polyethylene foam, and expanded polyethylene-polystyrene copolymer foam.

16. The multi-layer laminate structure of claim 13 wherein the foam core includes an aperture formed therein, the aperture is suitable for providing a passageway for hydraulic lines or electrical wires.

17. The multi-layer laminate structure of claim 13 wherein the fiber-reinforced plastic matrix comprises fibers selected from the group consisting of glass, carbon, graphite, aramid, polyester, boron, and combinations thereof.

18. A multi-layer laminate structure comprising:

a foam core formed of an expanded polyethylene-polystyrene copolymer foam, wherein the foam core has a thickness of about 6 inches, a width of about 1 foot, and length of about 8 feet;

a fiber-reinforced plastic matrix formed over and bonded to the foam core, wherein the fiber-reinforced plastic matrix has a thickness of about ⅛ of an inch, and wherein the multi-layer laminate structure is capable of supporting a load of at least 10,000 pounds.

19. The multi-layer laminate structure of claim 18 wherein the first foam core portion is an expanded foam selected from the group consisting of expanded polystyrene foam, expanded polypropylene foam, expanded polyethylene foam, and expanded polyethylene-polystyrene copolymer foam.

20. The multi-layer laminate structure of claim 18 wherein the foam core includes an aperture formed therein, the aperture is suitable for providing a passageway for hydraulic lines or electrical wires.

21. The multi-layer laminate structure of claim 18 wherein the fiber-reinforced plastic matrix comprises fibers selected from the group consisting of glass, carbon, graphite, aramid, polyester, boron, and combinations thereof.

* * * * *